US010960370B2

(12) United States Patent
Smith et al.

(10) Patent No.: US 10,960,370 B2
(45) Date of Patent: Mar. 30, 2021

(54) ULTRASONIC HOMOGENIZATION DEVICE WITH CLOSED-LOOP AMPLITUDE CONTROL

(71) Applicant: OMNI INTERNATIONAL, INC., Kennesaw, GA (US)

(72) Inventors: Spencer Smith, Marietta, GA (US); Chase Campbell, Acworth, GA (US)

(73) Assignee: Omni International, Inc., Kennesaw, GA (US)

( * ) Notice: Subject to any disclaimer, the term of this patent is extended or adjusted under 35 U.S.C. 154(b) by 264 days.

(21) Appl. No.: 16/002,531

(22) Filed: Jun. 7, 2018

(65) Prior Publication Data

US 2018/0353921 A1 Dec. 13, 2018

Related U.S. Application Data

(60) Provisional application No. 62/516,368, filed on Jun. 7, 2017.

(51) Int. Cl.
*B01F 15/00* (2006.01)
*G01N 1/28* (2006.01)
*B01F 11/02* (2006.01)

(52) U.S. Cl.
CPC .... *B01F 15/00285* (2013.01); *B01F 11/0258* (2013.01); *G01N 1/286* (2013.01); *B01F 2215/0037* (2013.01); *G01N 2001/2866* (2013.01)

(58) Field of Classification Search
CPC ............ B01F 11/0258; B01F 15/00285; B01F 2215/0037; G01N 1/286; G01N 2001/2866
See application file for complete search history.

(56) References Cited

U.S. PATENT DOCUMENTS

| 3,081,946 A | 3/1963 | Soloff |
| 3,107,647 A | 10/1963 | Soloff |
| 3,614,069 A | 10/1971 | Murry |

(Continued)

OTHER PUBLICATIONS

Sonics & Materials, "Patented Technology: Advancing the Field of Ultrasonic Technologies", 2018, <https://www.sonics.com/packaging/about/patented-technology/>.

*Primary Examiner* — Tony G Soohoo
(74) *Attorney, Agent, or Firm* — Gardner Groff & Greenwald, PC

(57) ABSTRACT

An ultrasonic system for homogenizing a sample includes an ultrasonic transducer and a control system. The transducer includes a horn or other probe that oscillates to produce cavitation in the sample and a converter that drives the horn through its oscillatory motion. The control system includes a closed-loop amplitude-control configuration and process. In particular, the control system includes a user interface, a controller, and a high-frequency driver, all connected together in a closed-loop configuration for enabling amplitude-control feedback. Control software includes programming for the closed-loop amplitude-control process including receiving a user-inputted desired amplitude of oscillatory horn motion, driving the transducer at a corresponding power level, determining the actual amplitude of oscillatory horn motion, and automatically adjusting the power level to the transducer to maintain the desired amplitude during operation of the ultrasonic system.

20 Claims, 3 Drawing Sheets

(56) References Cited

U.S. PATENT DOCUMENTS

| | | |
|---|---|---|
| 4,488,816 A | 12/1984 | Vota |
| 4,492,338 A | 1/1985 | Marelli |
| 4,708,127 A | 11/1987 | Abdelghani |
| 4,736,130 A | 4/1988 | Puskas |
| 4,868,445 A | 9/1989 | Wand |
| 5,325,339 A | 6/1994 | Yost |
| 5,694,373 A | 12/1997 | Garde |
| 5,897,569 A * | 4/1999 | Kellogg ............... B06B 1/0253 606/169 |
| 5,968,007 A | 10/1999 | Simon et al. |
| 6,159,176 A | 12/2000 | Broadwin et al. |
| 6,491,422 B1 * | 12/2002 | Rutten ............... B01F 11/0258 366/116 |
| 6,719,449 B1 | 4/2004 | Laugharn, Jr. et al. |
| 6,840,280 B1 | 1/2005 | Simon |
| 6,950,768 B2 | 9/2005 | Freund, Jr. et al. |
| 7,160,516 B2 | 1/2007 | Simon et al. |
| 7,329,039 B2 | 2/2008 | Laugharn, Jr. et al. |
| 7,521,023 B2 | 4/2009 | Laugharn, Jr. et al. |
| 7,686,500 B2 | 3/2010 | Laugharn, Jr. et al. |
| 7,687,026 B2 | 3/2010 | Laugharn, Jr. et al. |
| 7,687,039 B2 | 3/2010 | Laugharn, Jr. et al. |
| 7,811,525 B2 | 10/2010 | Laugharn, Jr. et al. |
| 7,828,192 B2 * | 11/2010 | Pochardt ............... B23K 20/10 156/73.1 |
| 8,009,508 B2 | 8/2011 | Young et al. |
| 8,240,213 B2 | 8/2012 | Donaty |
| 8,263,005 B2 | 9/2012 | Laugharn, Jr. et al. |
| 8,353,619 B2 | 1/2013 | Laugharn, Jr. et al. |
| 8,662,735 B2 * | 3/2014 | Luotola ............... B01F 11/0005 366/110 |
| 8,699,299 B2 | 4/2014 | Horsky et al. |
| 8,806,947 B2 | 8/2014 | Kajitani |
| 8,944,344 B2 | 2/2015 | Donaty |
| 9,070,856 B1 * | 6/2015 | Rose ..................... H01L 41/042 |
| 9,359,632 B2 * | 6/2016 | Loo ....................... C12Q 1/04 |
| 2005/0188743 A1 | 9/2005 | Land |
| 2006/0116610 A1 * | 6/2006 | Hare ................ A61B 17/22012 601/2 |
| 2007/0046144 A1 * | 3/2007 | Urano ..................... H02N 2/142 310/317 |
| 2011/0226869 A1 * | 9/2011 | Babaev ............... B01F 11/0258 239/102.2 |
| 2011/0314914 A1 * | 12/2011 | Gregg ..................... H03B 5/30 73/570.5 |
| 2014/0293729 A1 | 10/2014 | Ni et al. |
| 2017/0082471 A1 | 3/2017 | Ramanan et al. |
| 2018/0353921 A1 * | 12/2018 | Smith ..................... G01N 1/286 |
| 2019/0165247 A1 * | 5/2019 | Caldwell ............... H01L 41/042 |

* cited by examiner

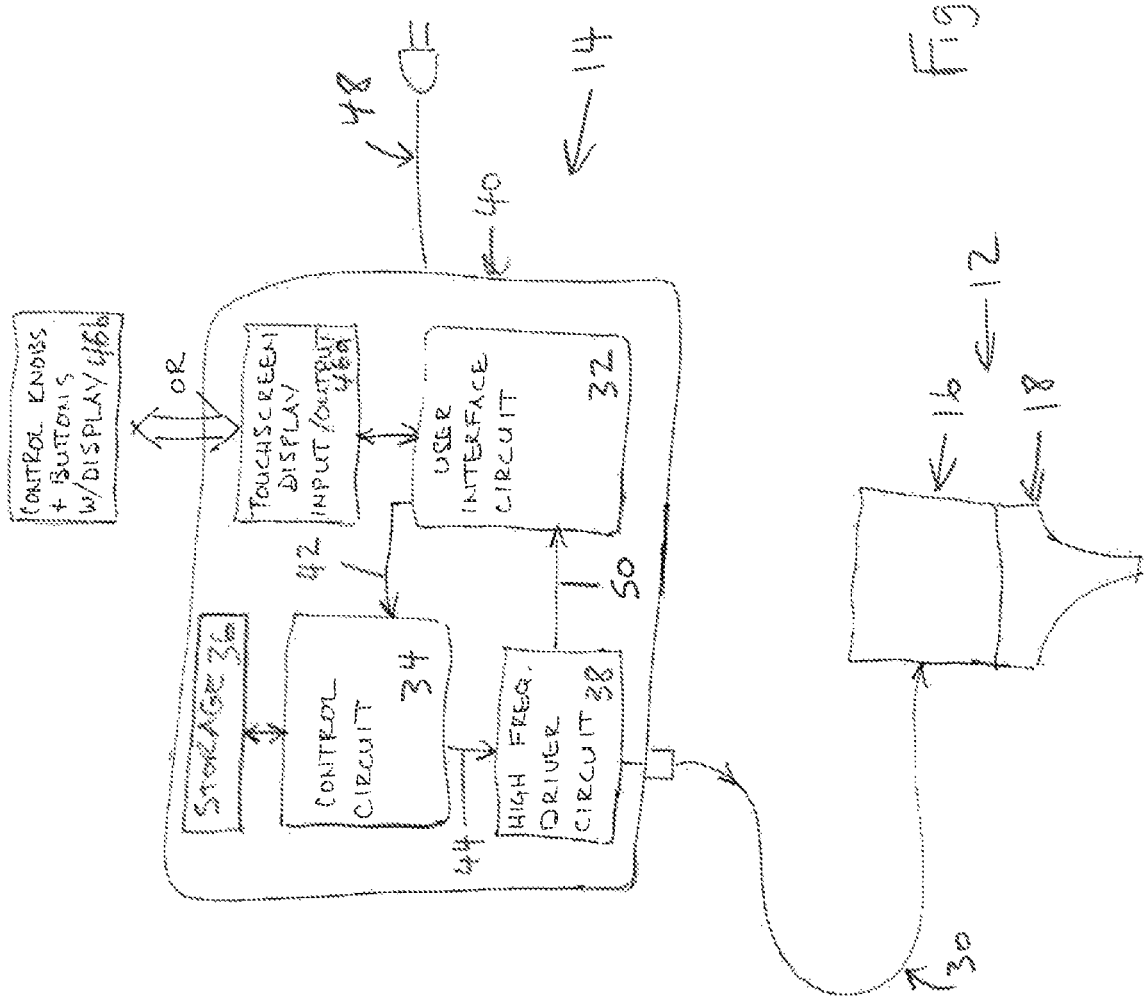

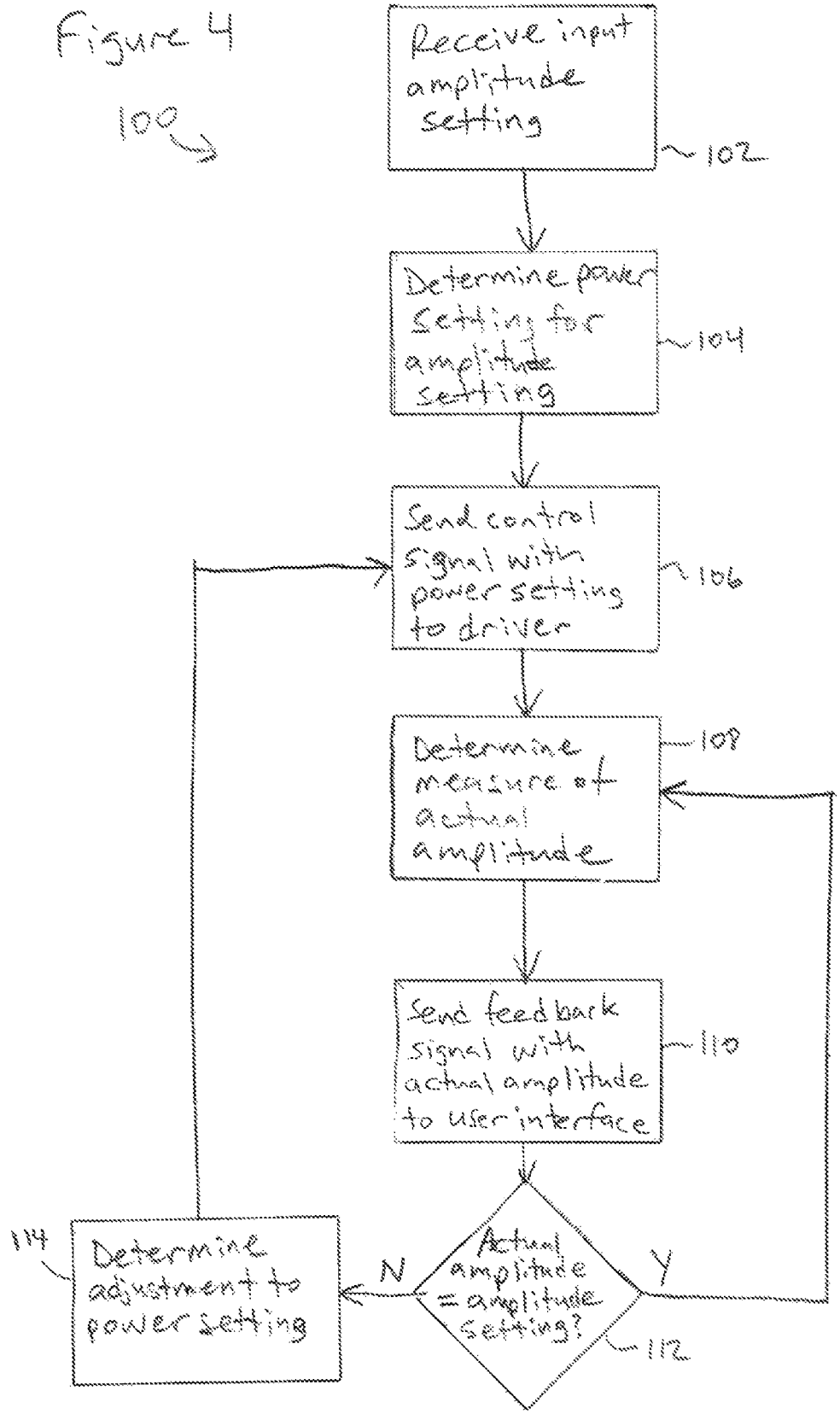

ULTRASONIC HOMOGENIZATION DEVICE WITH CLOSED-LOOP AMPLITUDE CONTROL

CROSS-REFERENCE TO RELATED APPLICATION

This application claims the priority benefit of U.S. Provisional Patent Application Ser. No. 62/516,368, filed Jun. 7, 2017, which is hereby incorporated herein by reference.

TECHNICAL FIELD

The present invention relates generally to laboratory devices for homogenizing sample materials, and particularly to such laboratory homogenizing devices with ultrasonic systems for homogenizing the samples.

BACKGROUND

Homogenization involves disaggregating, mixing, re-suspension, or emulsifying the components of a sample using a high-shear process with significant micron-level particle-size reduction of the sample components. Homogenization is commonly used for a number of laboratory applications such as creating emulsions, reducing agglomerate particles to increase reaction area, cell destruction for capture of DNA material (proteins, nucleic acids, and related small molecules), DNA and RNA amplification, and similar activities in which the sample is bodily tissue and/or fluid, or another substance.

Some laboratory homogenization equipment has been developed that includes ultrasonic systems for homogenizing the samples. Current ultrasonic homogenizing devices are typically configured with a user interface that allows the user to adjust a power control that increases the electrical power delivered to an ultrasonic horn to produce the desired horn oscillatory amplitude. The horn oscillates to cause cavitation in the sample, which breaks down the sample into very small disintegrated particles as desired for various purposes.

The amplitude of the motion of the end of the horn is important for effective homogenizing/processing, as it directly correlates to the amount of cavitation produced in the sample. Maintaining this oscillatory amplitude is typically performed either manually via the user interface by increasing the power to the converter or automatically via a closed-loop configuration with some type of on-board compensation circuit. In these automated systems, even though the homogenizing devices are sold by a power rating (e.g., in Watts), the power rating only denotes the capability of the homogenizer to drive a certain size range of horns. As a result, the amplitude of the horn end that engages the sample is controlled in a way that produces less-than-ideal cavitation.

Accordingly, it can be seen that there exists a need for a better way for controlling the amplitude of horn oscillatory motion of ultrasonic homogenizing devices for enhanced cavitation of the sample being processed. It is to the provision of solutions to this and other problems that the present invention is primarily directed.

SUMMARY

Generally described, the present invention relates to an ultrasonic sample-homogenizing system including an ultrasonic transducer and a control system. The ultrasonic transducer includes an ultrasonic horn or other ultrasonic probe that oscillates with an amplitude to produce cavitation in the sample, and an ultrasonic converter operably connected to the horn for driving the horn through its oscillatory motion. The control system is operably connected to the converter for controlling the operation of the transducer and includes a closed-loop amplitude-control configuration and process. In particular, the control system includes a user interface, a controller, and a high-frequency driver, all connected together in a closed-loop configuration for enabling amplitude-control feedback. Control software includes programming for the closed-loop amplitude-control process including receiving a user-inputted desired amplitude of oscillatory horn motion, driving the transducer at a corresponding power level, determining the actual amplitude of oscillatory horn motion, and automatically adjusting the power level to the transducer to maintain the desired amplitude during operation of the ultrasonic system.

The specific techniques and structures employed to improve over the drawbacks of the prior art and accomplish the advantages described herein will become apparent from the following detailed description of example embodiments and the appended drawings and claims.

BRIEF DESCRIPTION OF THE DRAWINGS

FIG. 3 is a schematic block diagram of the ultrasonic homogenizing system of FIG. 1, showing major components of a control system for controlling the amplitude of vibratory oscillation of the horn tip.

FIG. 4 is a process flow diagram showing a closed-loop control process for the ultrasonic homogenizing system of FIG. 1.

DESCRIPTION OF EXAMPLE EMBODIMENTS

Figure 2:
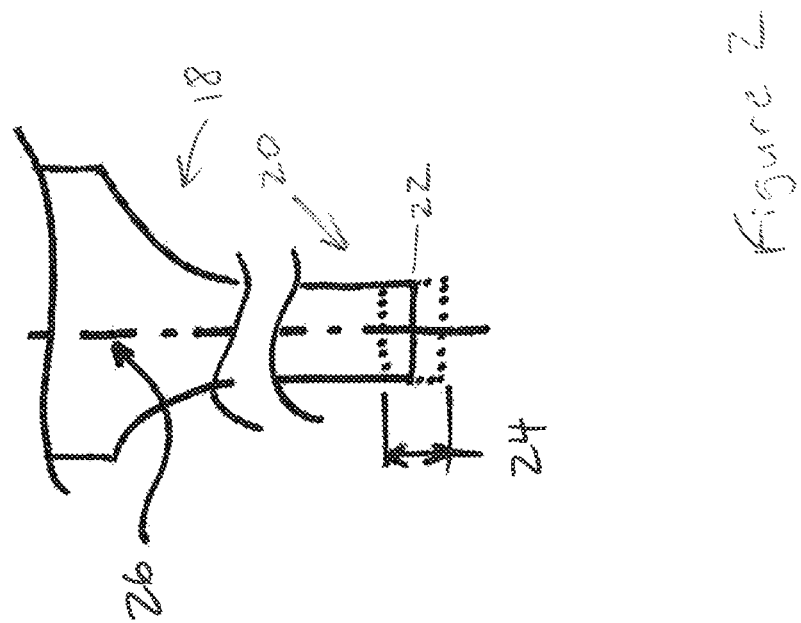
FIG. 2 is a detail side view of a portion of the horn of the ultrasonic homogenizing system of FIG. 1, showing an amplitude of oscillation of the horn tip.

The present invention relates to ultrasonic processing systems for homogenizing or otherwise processing samples. The ultrasonic processing systems include embodiments adapted for use in laboratory applications, embodiments adapted for processing fluid or other samples of the types described herein, and embodiments adapted for producing cavitation or other effects in the samples.

FIGS. 1-4 show an ultrasonic homogenizing system 10 according to an example embodiment of the invention. The system 10 is adapted for processing a sample 8 held in a sample container 6, including samples of types commonly homogenized in laboratories and held in conventional laboratory containers. The system 10 includes an ultrasonic transducer 12 and a control system 14 for the ultrasonic transducer. The ultrasonic transducer 12 and the control system 14 can be provided as separate components operably connected together (as depicted) or they can be provided as an integral unit.

Figure 1:
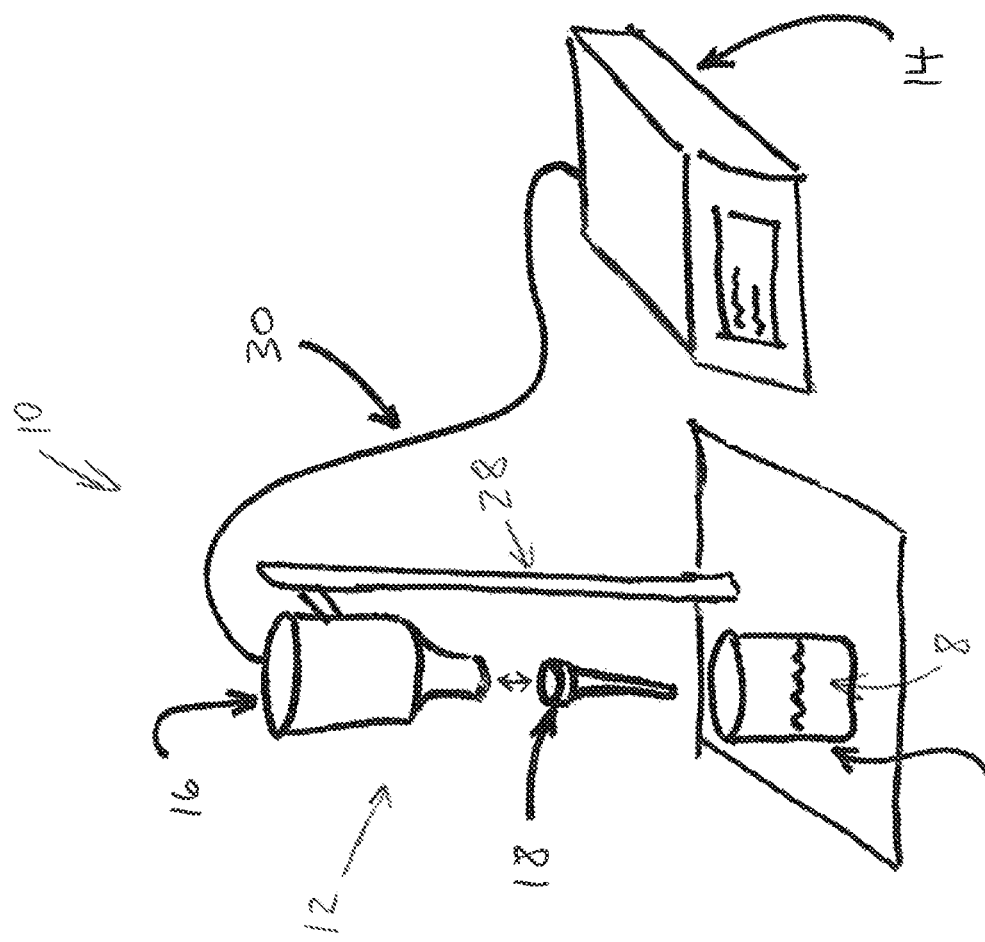
FIG. 1 is a perspective view of an ultrasonic homogenizing system according to an example embodiment of the present invention, showing an ultrasonic horn and an ultrasonic converter in an exploded arrangement, and showing the ultrasonic horn not yet immersed into a sample.

Referring particularly to FIGS. 1-2, the ultrasonic transducer 12 can be of a conventional type and design for use in applications to produce cavitation and resulting disintegration in sample media. Thus, the ultrasonic transducer 12 includes a converter having for example piezoelectric, capacitive, or other transducing components, and includes an interface having for example a horn, other probe, or other immersion, contact, or other interface device. In the depicted embodiment, for example, the ultrasonic transducer 12 includes an AC ultrasonic converter 16 and an ultrasonic horn 18 removably mounted to the converter. Typically, additional horns 18 of the same and/or other conventional types and/or sizes are provided so that the horn can be changed out based on the sample to be homogenized, to provide a fresh horn for each sample, etc. The converter 16 converts electrical energy to mechanical energy, and the ultrasonic horn 18 is mounted to the converter for transmitting the resulting ultrasonic waves to the sample 8.

The ultrasonic homogenizing/processing occurs at the immersed tip portion 20 of the horn 18, which typically has a flat leading edge 22 for enhanced cavitation. The converter 16 drives the horn 18 so that its tip edge 22 moves sinusoidally, in an oscillating or reciprocating motion with an amplitude (e.g., about 140 microns) 24, in a direction along and parallel to the horn axis 26. This horn oscillatory motion is at very high frequencies (e.g., about 20 kHz) such that it causes cavitation in the sample 8 such that the sample is disintegrated into very small particles as desired for various purposes. For example, all of the individual components can be tuned to a 20 kHz resonant frequency, with the assembled components together creating a tuned assembly very close to 20 kHz.

The transducer 12 can be supported above the sample 8 by a stand 20 of a conventional type for example for use on laboratory tables or benches. In the depicted embodiment, for example, the stand 28 includes a base and a riser extending upright from the base and to which the transducer 12 mounts. Also, the ultrasonic transducer 12 and the control system 14 are operably connected together by a connection 30, for example a power/control line (as depicted), a wireless connection, etc. The converter 16, the horn 18, the stand 28, and the connection 30 can all be of a conventional type with a design, construction, configuration, and operation well known to persons of ordinary skill in the art, and as such for brevity these components are not further detailed herein.

Referring particularly to FIG. 3, the control system 14 includes a user interface 32, a controller 34, a storage device 36, and a high-frequency driver 38, all operably connected together and provided in a housing 40. In response to inputs from a user, the user interface 32 communicates input signals 42 to the controller 34, which processes the input signals and communicates control signals 44 to the high-frequency driver 38, which in response operates to excite the ultrasonic transducer 12 via the connection 30. The storage device 36 stores computer-readable instruction sets (i.e., a software control program) for controlling the controller 34 to implement the desired functionality and operation of the system 10 based on the input signals 42 from the user interface 32.

The controller 34 can be provided by a conventional computer processor for example of a type commonly used in control systems for laboratory equipment. The storage device 36 can be provided by a conventional fixed-medium data-storage device such as a magnetic disk drive for example of a type commonly used in control systems for laboratory equipment. In other embodiments the storage is provided by onboard memory of the controller. The high-frequency driver 38 can be provided by a conventional ultrasonic driver for example of a type commonly used for driving ultrasonic control systems for sample-media disintegration applications. And the housing 40 can be provided by a conventional enclosure for example of a type commonly used in control systems for laboratory equipment.

In addition, the user interface 32 includes conventional input and output interface elements such as for example the depicted touchscreen display (input and output) 46a and/or the depicted display (output) and knobs and buttons (input) 46b. A power supply system (e.g., including an AC electric cord 48) provides a high-frequency (e.g., 20 kHz), high voltage (e.g., 800 VAC) power for driving the ultrasonic transducer 12. And the connection 30 can be removably connected to the control system 14 via a connector attached to the housing 40. All of these and other components of the control system 14 are conventional and well known to persons of ordinary skill in the art, and as such for brevity these components are not detailed further herein.

The control system 14 additionally includes innovative features for providing for auto-tuning via closed-loop amplitude control. In particular, the high-frequency driver 38 communicates a feedback signal 50 to the user interface 32, for example directly (as depicted) or alternatively via the controller. As such, the user interface 32, the programmed controller 34, and the high-frequency driver 38, together form a closed-loop amplitude-control configuration of the control system 14.

The closed-loop amplitude-control system 14 is configured and programmed to allow the user to set a desired amplitude 24 of oscillatory motion of the ultrasonic horn 18 (via the user interface 32), and then the system constantly (e.g., at regular frequent intervals such as less than every second) receives feedback and automatically adjusts the power level to the converter 16 (via the driver 38) in order to maintain the set horn amplitude during operation of the ultrasonic homogenizing system 10. Power output/consumption can be output (e.g., displayed) by the user interface 24 as a convenience to users interested in the power consumption of the system 10. This represents an important and advantageous shift away from the convention of equating power consumption to processing effectiveness.

The closed-loop amplitude-control system 14 can include an amplitude-sensing element that is used for determining or receiving the actual amplitude for feeding back to the user interface 32. For example, the converter 16 can determine (e.g., measure or sense) an inductance or impedance value of the drawn power, from which the actual amplitude can be determined. In this way, the control software can include programming for auto-tuning the ultrasonic homogenizing system 10 by controlling the controller 34 to adjust the power delivered to the converter 16 based on the sensed amplitude of the oscillatory motion of the horn 18. Also, the control software can be programmed with preset percentages of maximum power, which upon being reached trigger alerts being sent to the user interface 32.

In some embodiments, the closed-loop amplitude-control system 14 includes a waveform generator IC to vary the output frequency when the resonant frequency changes. The waveform generator IC can calibrate on demand by using an algorithm (programmed into the control software) to sweep the entire frequency range, determine the frequency at maximum current draw (resonant frequency), and set the output frequency for a given horn 18. Also, while running, the control system 14 can monitor current draw while making slight variations to the frequency (e.g., within milliseconds) if it determines the resonant frequency has changed due to a change in load. Further, waveform generator has a high resolution output, meaning that this system 14 is far more accurate at tracking and adjusting to the resonant frequency.

In addition, the feedback signal 50 is sent from the driver 38 to the user interface 32, where additional logic and more complex analyses can be applied, and based on that an updated input signal 42 is sent to the controller 34. As such, the user interface 32 can include a programmed processer for performing such additional logic and more complex analyses. This is in contrast to conventional devices, in which a feedback signal goes from the driver directly to the controller where there is limited ability to provide accurate amplitude compensation (generally targeting a more vague amplitude percentage value). In this way, the closed-loop amplitude-control system 14 provides more accurate amplitude compensation and also provides the ability to compare the amount of compensation to known values that can provide user alerts (e.g., messages output via the user interface 32) for known error conditions.

Furthermore, the closed-loop amplitude-control system also provides for monitoring the efficiency of the horn 18. Over time, the smooth flat face/end 22 of the horn 18 that is perpendicular to the horn axis 26 gets pitted due to the violent forces resulting from the cavitation. This pitting makes the horn 18 less efficient and, if allowed enough time, can wear off enough material that the horn no longer resonates at the matched frequency (typically 20 kHz), further reducing (and eventually eliminating) the cavitation effect. However, the closed-loop control system 14 can make a determination for a given horn 18 of the power required to maintain a given amplitude 24, and when the horn has degraded to the point that it cannot maintain that amplitude, then the system 14 will send an alert to the user (e.g., via the user interface 24) that the horn 18 is in need of replacement or installed incorrectly.

Referring particularly to FIG. 4, the control software includes programming for implementing a closed-loop amplitude-control process 100 to provide the auto-tuning functionality described above. The control software can be stored on the storage device 36 or another non-transitory storage media. As such, additional aspects of the invention include the closed-loop amplitude-control process 100 and a non-transitory storage media storing instructions for carrying out the closed-loop amplitude-control process.

The closed-loop amplitude-control process 100 includes at step 102 receiving a user-inputted desired amplitude setting for the oscillatory horn motion. The desired amplitude setting can be input via the user interface components 46a and/or 46b. At step 104, a power setting is determined based on the amplitude setting. The power setting can be determined based on a correlation between power levels and amplitude values for the horn 18 being used and the sample 8 being homogenized, with this data stored in a database on the storage device or otherwise accessible by the controller 34. And at step 106, a control signal 44 that includes the power setting is sent to the driver 38 for driving the converter 16.

The horn 16 is now oscillating and producing cavitation in the sample 8 to provide homogenization. At step 108, a value corresponding to the actual amplitude of the oscillatory horn motion is determined (e.g., measured or sensed) or received. As an example, the driver 38 or converter 16 can determine an inductance or impedance value of the power drawn by the converter, and this value can be fed back to the controller 34 for analysis to determine the actual amplitude. As another example, a waveform generator IC can determine resonant frequency changes, and this can be used for analysis to determine the actual amplitude.

At step 110, a feedback signal 50 that includes the value corresponding to the actual amplitude of the oscillatory horn motion is sent to the user interface 32. The actual amplitude of the oscillatory horn motion is determined based on the corresponding value, with this determination done by the user interface 32 (e.g., including a programmed processor) or by the main controller 34. Thus actual amplitude can be output (e.g., displayed) to the user vie the user interface 32 and the amplitude setting (or other inputs) can be manually adjusted, and any appropriate alerts can be output to the user.

Then at step 112, the actual amplitude is compared to the set amplitude. If the actual amplitude is equal to (e.g., within preset tolerances) the set amplitude, then the process returns to step 108 in a loop for ongoing monitoring and adjustments.

But if the actual amplitude is not equal to the set amplitude, then at step 114 an adjustment to the power setting is determined. For example, if the actual amplitude is 10% lower, then the power level setting can be increased by 10%. The adjustment to the power setting can be determined based on predetermined logic and correlations between power levels and amplitude values, with this data stored in a database on the storage device or otherwise accessible by the controller 34.

The process then returns to step 106 in a loop for sending an adjusted power-setting control signal to the driver 38. The process continues in this way, with the actual amplitude being regularly determined and the power setting being regularly adjusted to better provide the intended homogenization results. The process continues during operation of the homogenization system until the sample has been processed as desired.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the specific sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. An ultrasonic system for processing a sample, the system comprising:
   an ultrasonic horn that oscillates to produce cavitation in and thereby disintegrate the sample;
   an ultrasonic converter operably connected to the horn for driving the horn through its oscillatory motion; and
   a control system operably connected to the converter for controlling the operation of the converter, wherein the control system includes a user interface, a controller, and a high-frequency driver, all connected together in a closed-loop configuration for enabling amplitude-control feedback, and wherein the controller is programmed with a closed-loop amplitude-control process including receiving a user-inputted set amplitude of oscillatory horn motion, driving the converter at a corresponding power level, determining an actual amplitude of the oscillatory horn motion, and automatically adjusting the power level to the converter to maintain the set amplitude of the oscillatory horn motion during operation of the ultrasonic system, wherein the controller determines the actual amplitude of oscillatory horn motion based on an inductance or impedance value of power drawn by the converter.

2. The ultrasonic system of claim 1, wherein the high-frequency driver communicates with the user interface to form the closed-loop configuration and to send a feedback signal to the user interface, wherein the feedback signal includes a value related to the actual amplitude of oscillatory horn motion.

3. The ultrasonic system of claim 2, wherein in response to the feedback signal being received, the user interface activates an alert to notify a user of a predefined error condition.

4. The ultrasonic system of claim 2, wherein the high-frequency driver receives the value related to the actual amplitude of oscillatory horn motion from the converter.

5. The ultrasonic system of claim 1, wherein the controller is programmed to implement sweeps of an entire frequency range of the transducer, determine a frequency of the transducer at maximum current draw, determine if a resonant frequency of the transducer has changed, and if so then adjust an output frequency of the transducer.

6. The ultrasonic system of claim 5, further comprising a waveform generator that is used to determine the actual amplitude of oscillatory horn motion.

7. The ultrasonic system of claim 2, wherein the control system compares the actual amplitude of oscillatory horn motion to the set amplitude of oscillatory horn motion and determines an adjustment to the power level to adjust the actual amplitude of oscillatory horn motion to closer to the set amplitude of oscillatory horn motion.

8. The ultrasonic system of claim 1, wherein in response to the feedback signal being received, the control system determines the minimum power level required to maintain operation of the horn at the set amplitude, and when the minimum power level cannot be delivered to the converter then the user interface activates an alert to notify a user that the horn needs replacement.

9. The ultrasonic system of claim 1, further comprising a component that is operable to sense or measure the actual amplitude of the horn oscillatory motion, or to sense or measure another value that can be processed to determine the actual amplitude of the horn oscillatory motion, for sending to the control system.

10. A closed-loop amplitude-control system of an ultrasonic system including an ultrasonic transducer that produces cavitation in a sample, the control system comprising:
a user interface;
a controller in communication with the user interface; and
a high-frequency driver in communication with the controller, wherein the driver is in communication with and controls the operation of the transducer, wherein the user interface, the controller, and the high-frequency driver are operably connected together in a closed-loop configuration for enabling amplitude-control feedback of the converter, and wherein the controller is programmed with a closed-loop amplitude-control process including receiving a user-inputted set amplitude of oscillatory transducer motion, driving the transducer at a corresponding power level, determining an actual amplitude of oscillatory transducer motion, and automatically adjusting the power level to the transducer to maintain the set amplitude during operation of the ultrasonic system,
wherein the high-frequency driver communicates with the user interface to form the closed-loop configuration and to send a feedback signal to the user interface, wherein the feedback signal includes a value related to the actual amplitude of oscillatory transducer motion, and wherein in response to the feedback signal being received, the user interface activates an alert to notify a user of a predefined error condition,
wherein the high-frequency driver receives the value related to the actual amplitude of oscillatory transducer motion from the transducer, and wherein in response to the feedback signal being received, the control system compares the actual amplitude of oscillatory transducer motion to the set amplitude of oscillatory transducer motion and determines an adjustment to the power level to adjust the actual amplitude of oscillatory transducer motion to closer to the set amplitude of oscillatory transducer motion, and
wherein in response to the feedback signal being received, the control system determines the minimum power level required to maintain operation of the transducer at the set amplitude, and when the minimum power level cannot be delivered to the transducer then the user interface activates an alert to notify a user that an oscillating component of the transducer needs replacement.

11. The closed-loop amplitude-control system of claim 10, further comprising a component that is operable to sense or measure the actual amplitude of the transducer oscillatory motion, or to sense or measure another value that can be processed to determine the actual amplitude of the transducer oscillatory motion, for sending to the control system.

12. The closed-loop amplitude-control system of claim 10, wherein the controller determines the actual amplitude of oscillatory transducer motion based on an inductance or impedance value of power drawn by the transducer.

13. The closed-loop amplitude-control system of claim 10, further comprising a waveform generator that is used to determine the actual amplitude of oscillatory transducer motion.

14. The closed-loop amplitude-control system of claim 10, wherein the transducer includes an ultrasonic horn that oscillates to produce the cavitation in the sample and an ultrasonic converter that is operably connected and drives the transducer horn through the oscillatory motion, and wherein the high-frequency driver receives the value related to the actual amplitude of oscillatory horn motion from the converter of the transducer.

15. The closed-loop amplitude-control system of claim 10, wherein the controller determines the actual amplitude of oscillatory horn motion based on an inductance or impedance value of power drawn by the converter, further comprising a waveform generator that is used to determine the actual amplitude of oscillatory horn motion by sweeping an entire frequency range of the transducer to determine a frequency of the transducer at maximum current draw.

16. A closed-loop amplitude-control process for operating an ultrasonic system including an ultrasonic transducer with a component that oscillates to produce cavitation in a sample, the process comprising:
receiving a user-inputted set amplitude for the oscillatory motion of the transducer;
determining a power setting corresponding to the set amplitude of the oscillatory transducer motion;

sending a control signal including the power setting to a high-frequency driver in communication with the transducer to operate the transducer;

determining or receiving a value corresponding to an actual amplitude of the oscillatory transducer motion; and comparing the actual amplitude of the oscillatory transducer motion to the set amplitude of the oscillatory transducer motion, wherein if the actual amplitude is not equal to the set amplitude, then an adjustment to the power setting is determined, and then in a feedback loop the process returns to the step of sending the control signal including the power setting except with the power setting being adjusted, wherein if the actual amplitude is equal to the set amplitude, then the process returns to the step of determining or receiving the value corresponding to the actual transducer amplitude for ongoing monitoring and adjustments, and wherein the process includes sweeping an entire frequency range of the transducer, determining a frequency of the transducer at maximum current draw, determining if a resonant frequency of the transducer has changed, and if so then adjusting an output frequency of the transducer.

17. The closed-loop amplitude-control process of claim 16, wherein if the actual amplitude is not equal to the set amplitude, then further an alert of a user interface is activated to notify a user of a predefined error condition.

18. The closed-loop amplitude-control process of claim 16, wherein the value corresponding to an actual amplitude of the oscillatory transducer motion is an inductance or impedance value of power drawn by the transducer.

19. The closed-loop amplitude-control process of claim 16, wherein the actual amplitude of the oscillatory transducer motion is automatically tuned based on the feedback loop without additional user input.

20. A non-transitory storage media storing instructions for performing the closed-loop amplitude-control system of claim 16.

* * * * *